Sept. 24, 1929.  G. DELAGE  1,729,210
WING SURFACE USED IN AERONAUTICS
Filed March 3, 1927
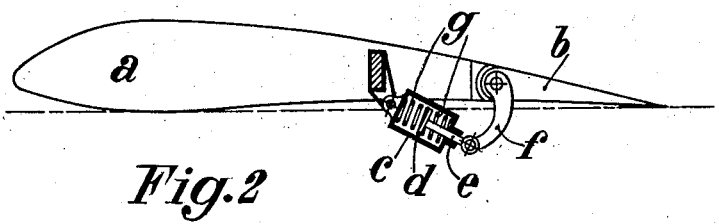
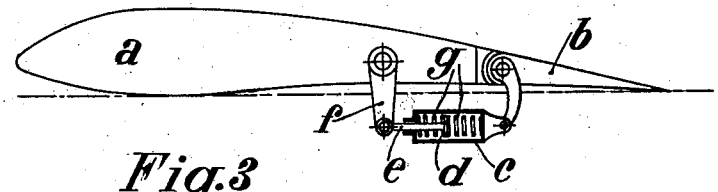
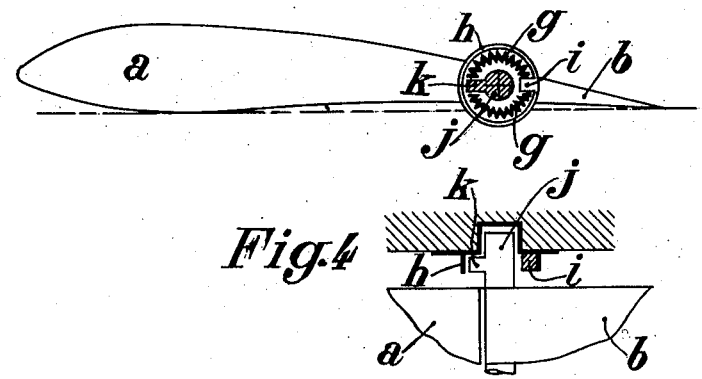
G. Delage
inventor
By: Marks & Clerk
Attys.

Patented Sept. 24, 1929

1,729,210

UNITED STATES PATENT OFFICE

GUSTAVE DELAGE, OF PARIS, FRANCE, ASSIGNOR TO SOCIÉTÉ ANONYME: NIEUPORT-ASTRA, OF ISSY-LES-MOULINEAUX, FRANCE, A COMPANY OF FRANCE

WING SURFACE USED IN AERONAUTICS

Application filed March 3, 1927, Serial No. 172,501, and in France March 12, 1926.

It is known that, generally speaking, for large angles of incidence which correspond to horizontal flights, with reduced power or to ascending flights, the position of the center of pressure is situated in the front half of the profile of the wing surface. For small angles which correspond to horizontal flights or to dives, the center of pressure is, on the contrary, situated in the rear half of the profile.

To this variation of position of the center of thrust corresponds of course a variation of the stresses which act on the wings. These stresses can become very important during a dive or of a sudden rightening. They can even cause a rupture of the machine.

The present invention has for its object an improvement in wing surfaces used in aeronautics, for the purpose of remedying the above mentioned inconveniences. The essential feature of this improvement resides in that one or more portions of the profile of the wing surface are resiliently assembled on the main body, so that the profile of normal flight can be automatically subjected to a sudden modification when the stresses on the surface exceed a predetermined value.

In the accompanying drawing and by way of example:

Figs. 1, 2, 3, 4 illustrate various forms of carrying out the improvement forming the subject-matter of the invention.

For avoiding the above mentioned inconveniences, the profile of the wing surfaces established in accordance with the present invention is constituted:

1.—By a part $a$ the position and inclination of which remain invariable relatively to the line of action of the propeller;

2.—By at least a part $b$ movable relatively to the said fixed part $a$; the connection between these sections of the profile being resiliently effected.

In these conditions:

(a) All the features of the profile remain constant up to a predetermined limit.

(b) The resiliency of the connections joining the constituent elements $a$—$b$, of the profile allows the movable parts $b$ to move relatively to the fixed part $a$ supporting them under a load greater than the predetermined limit.

(c) By the relative displacement of the movable parts $b$ with relation to the fixed part $a$ supporting them, the profile of the surface is suddenly modified so that the center of pressure moves forwardly.

Practically, use may be made of one of the following arrangements, which are moreover given by way of example only and in the particular case in which the relative displacement of the fixed part $a$ and movable part $b$ is obtained by pivotal movement.

In the form of construction of Fig. 1, on the fixed part $a$ of the surface are pivoted cylinders $c$ provided with two bottoms. Within each of these cylinders $c$ is arranged a piston $d$ the rod of which passes through one of the bottoms and is pivotally connected to the end of a lever $f$ rigidly secured on the movable part $b$ of the surface; this movable part $b$ is pivoted on the fixed part $a$ so that it can be subjected to angular displacements relatively to the latter.

Between the piston $d$ and each bottom of its cylinder $c$ are arranged springs $g$ the tension of which is suited to the limit stress which the surface is to support without its profile being modified.

Members for adjusting the tension of the said springs $g$ can be provided. Use may also be made of any other means than springs for realizing the resilient connection, with predetermined limit, acting between the constituent parts of the surface (for instance compressed gas, sandow, etc.).

Fig. 2 illustrates the same device as that above mentioned but this device is placed on the ordinary control of a wing flap $b$.

The modification (Figs. 3—4) consists in the use of a resilient coupling sleeve for connecting together the fixed part $a$ and the movable part $b$ of the surface. The fixed part $a$ is provided with cylindrical casings $h$ having inner abutments $i$ and in the axis of which enter the trunnions $j$ of the movable portion $b$. Each trunnion $j$ is provided, within the corresponding casing $h$, with a side abutment $k$. Between the movable abutment $k$ and the fixed abutment $i$ are interposed springs $g$.

It is obvious that instead of a single movable part $b$, the fixed part $a$ might be extended in several juxtaposed parts moving relatively to each other under the control of resilient systems, of different powers, connecting them.

The displacements of the movable part or parts might produce the actuation of a system capable of warning the pilot the machine is overloaded.

The above mentioned arrangements entirely distinguish from wing surfaces having a supple trailing edge which have already been proposed. In fact, in case of utilization of these latter, the variations of the stresses which act upon the same have simply for result to modify the general curvature of the distortable portion of the profile. In the system forming the subject-matter of the present invention, the object, on the contrary, is to produce sudden discontinuities in the profile of normal flight.

What I claim is my invention and desire to secure by Letters Patent is:

A wing surface comprising a front part and a rear part movable angularly relative to each other, an operating member pivoted to one of the said parts, elastic means for kinematically connecting the said operating member to the other part.

In testimony whereof I have signed my name to this specification.

GUSTAVE DELAGE.